United States Patent
La et al.

(10) Patent No.: US 11,814,705 B1
(45) Date of Patent: Nov. 14, 2023

(54) INCONEL 625 ALLOY WITH HIGH ALUMINUM CONTENT AND PREPARATION METHOD THEREOF

(71) Applicant: Lanzhou University of Technology, Lanzhou (CN)

(72) Inventors: Peiqing La, Lanzhou (CN); Mingchen Du, Lanzhou (CN); Jing Jin, Lanzhou (CN); Penghui Yang, Lanzhou (CN); Jie Sheng, Lanzhou (CN); Haicun Yu, Lanzhou (CN); Yunteng Gao, Lanzhou (CN); Linlin Du, Lanzhou (CN); Zemin Bai, Lanzhou (CN)

(73) Assignee: Lanzhou University of Technology, Lanzhou (CN)

( * ) Notice: Subject to any disclaimer, the term of this patent is extended or adjusted under 35 U.S.C. 154(b) by 0 days.

(21) Appl. No.: 17/989,959

(22) Filed: Nov. 18, 2022

(30) Foreign Application Priority Data

May 5, 2022 (CN) .......................... 202210479101.6

(51) Int. Cl.
*C22C 19/05* (2006.01)
*C22F 1/10* (2006.01)
*C22C 1/02* (2006.01)
*C22F 1/00* (2006.01)

(52) U.S. Cl.
CPC ............ *C22C 19/057* (2013.01); *C22C 1/023* (2013.01); *C22C 19/056* (2013.01); *C22F 1/002* (2013.01); *C22F 1/10* (2013.01)

(58) Field of Classification Search
CPC ........ C22C 19/056; C22C 19/057; C22F 1/10
See application file for complete search history.

(56) References Cited

U.S. PATENT DOCUMENTS 6,478,897 B1 * 11/2002 Izumida ............... C22C 19/057
148/908

FOREIGN PATENT DOCUMENTS

| CN | 107012380 A | 8/2017 |
| JP | 2018188738 A | 11/2018 |

* cited by examiner

*Primary Examiner* — Jessee R Roe

(57) ABSTRACT

An Inconel 625 alloy with high aluminum content and a preparation method thereof are provided. The alloy includes following components by mass percentage: chromium 5~13%, ferrum 5%, niobium 4.15%, molybdenum 10%, aluminum 5~9% and a rest is nickel. The preparation method includes: step (1): weighing reactive materials according to a preset ratio and putting the reactive materials into a planetary ball miller for ball milling; step (2): pressing the ball milled reactive materials into a cake-shaped slab; step (3) putting the cake-shaped slab into a reactor and putting an igniter on the cake-shaped slab, then adding the reactor with protective gas, heating up until a self-propagating reaction occurs in the reactor, thereby obtaining a base alloy; step (4): performing secondary smelting on the base alloy to obtain an ingot; step (5): performing a solution treatment on the ingot to obtain the Inconel 625 alloy with high aluminum content.

1 Claim, 8 Drawing Sheets

INCONEL 625 ALLOY WITH HIGH ALUMINUM CONTENT AND PREPARATION METHOD THEREOF

TECHNICAL FIELD

The disclosure relates to the technical field of preparation for Inconel 625 alloy with high aluminum content.

BACKGROUND

Concentrated solar power (CSP) technology can not only effectively provide electricity, but also significantly reduce carbon dioxide ($CO_2$) emissions worldwide; as one of the most competitive alternatives to fossil fuels, it has attracted more and more attention. With the advantages of a low cost, a low melting point, a high boiling point and good heat transfer performance, chloride molten salt has been proposed as a candidate medium material for heat transfer fluids (HTF) and thermal energy storage (TES) in the next generation CSP power station. However, the chloride molten salt is extremely corrosive to the pipes of the thermal energy storage and heat transfer systems, and prior structural materials have poor corrosion resistance to chloride molten salt at high temperatures. Therefore, it is of great significance to develop new alloys that can be used in a corrosive environment of the chloride molten salt at high temperature.

The nickel-based superalloy has good strength, corrosion resistance and oxidation resistance at high temperature and it is widely used in in the field of superalloys. The nickel-based superalloy not only has good oxidation resistance and corrosion resistance at high temperature, but also has relatively high creep strength and durability, and it is regarded as a structural candidate material for a next generation of CSP. Related research indicates that aluminium (Al) element can well improve corrosion resistance of alloys to the molten salt at high temperature, mainly due to the fact that a formed aluminum oxide film has good compactness, and the aluminum oxide film is not easy to fall off in the chloride molten salt at high temperature, and the corrosion resistance is reduced due to the chromium (Cr) element will melt firstly in the chloride molten salt. Therefore, on the basis of standard components of the Inconel 625 alloy, the Al content is increased, the Cr content is reduced, and the Inconel 625 alloy with high aluminum content is prepared in the disclosure.

SUMMARY

A purpose of the disclosure is to provide an Inconel 625 alloy with high aluminum content and a preparation method thereof.

The Inconel 625 alloy with high aluminum content and preparation method thereof provided by the disclosure. The Inconel 625 alloy with high aluminum content consists of following components by mass percentage: 5%~13% of chromium (Cr), 5% of ferrum (Fe), 4.15% of niobium (Nb), 10% of molybdenum (Mo), 5~9% of aluminum (Al), and the balance of nickel (Ni).

The preparation method for the Inconel 625 alloy includes following steps:
step (1), weighing reactive materials according to a preset ratio and putting the weighted reactive materials into a planetary ball miller for ball milling;
step (2), pressing, by a press machine, the reactive materials obtained after the ball milling into a cake-shaped slab with a diameter of 80 mm and a height of 50 mm;
step (3), putting the cake-shaped slab into a reactor, arranging an igniter on the cake-shaped slab, adding a protective gas for gas-scrubbing, re-adding the protective gas for maintaining gas pressure, and performing heating to cause a self-propagating reaction and thereby obtain a base alloy;
step (4), performing secondary smelting on the base alloy by vacuum induction to obtain an ingot; and
step (5), performing a solution treatment on the ingot at a temperature of 1150° C. for 30 min, to obtain the Inconel 625 alloy.

The disclosure has advantages of simplifying production equipment and operations. Compared with current preparation processes for the nickel-based alloy, such as vacuum induction melting (VIM)+vacuum arc remelting (VAR), VIM+electroslag remelting (ESR) and VIM+PESR (electroslag remelting in protective atmosphere), the preparation method of the disclosure has a simple process and less energy consumption, which is suitable for commercial production. Based on the standard components of the Inconel 625 alloy, the disclosure controls the Al content and reduces the Cr content of the Inconel 625 alloy by adding excessive Al.

DETAILED DESCRIPTION OF EMBODIMENTS

Figure 1:
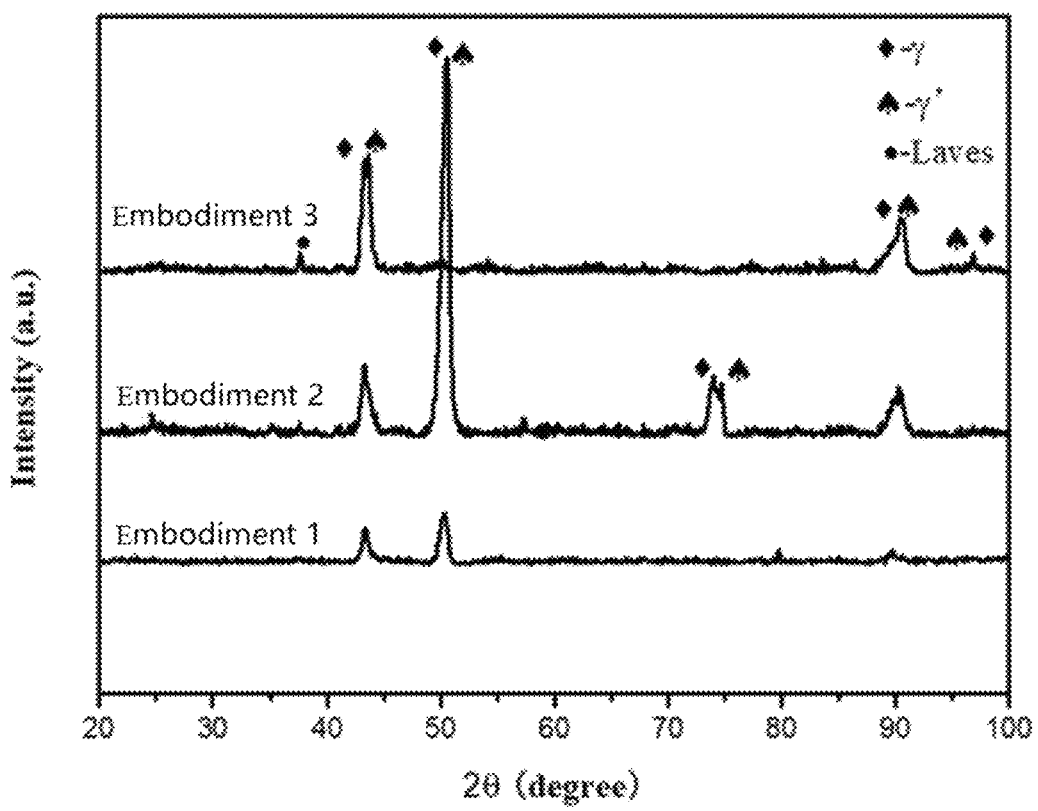
FIG. 1 shows XRD (X-ray diffraction) patterns of embodiments 1, 2, and 3.
Figure 2:
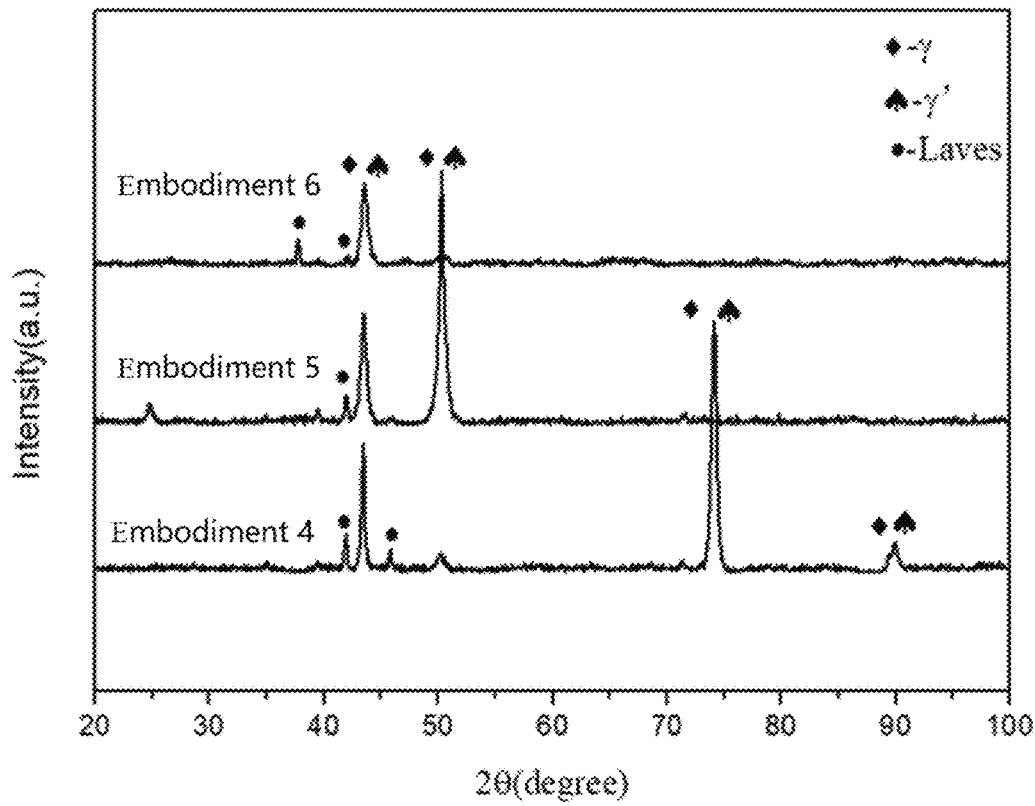
FIG. 2 shows XRD patterns of embodiments 4, 5, and 6.
Figure 3:
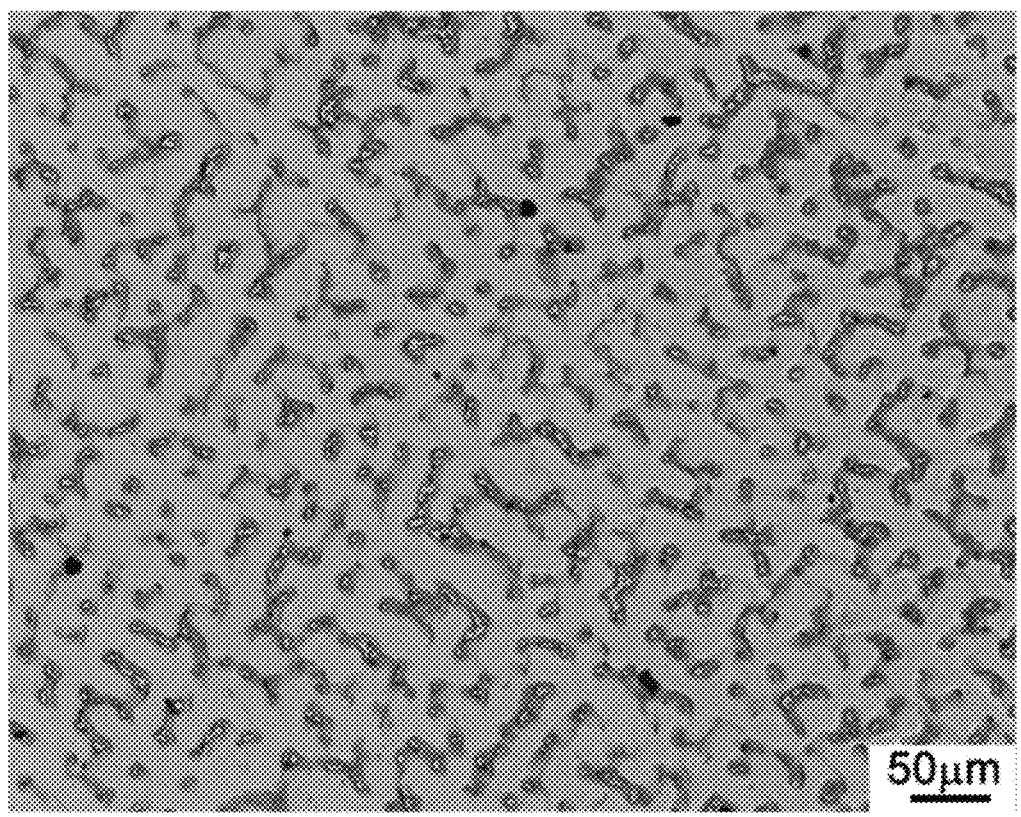
FIGS. 3~8 show metallographic organization diagrams of embodiments 1-6 respectively.
Figure 4:
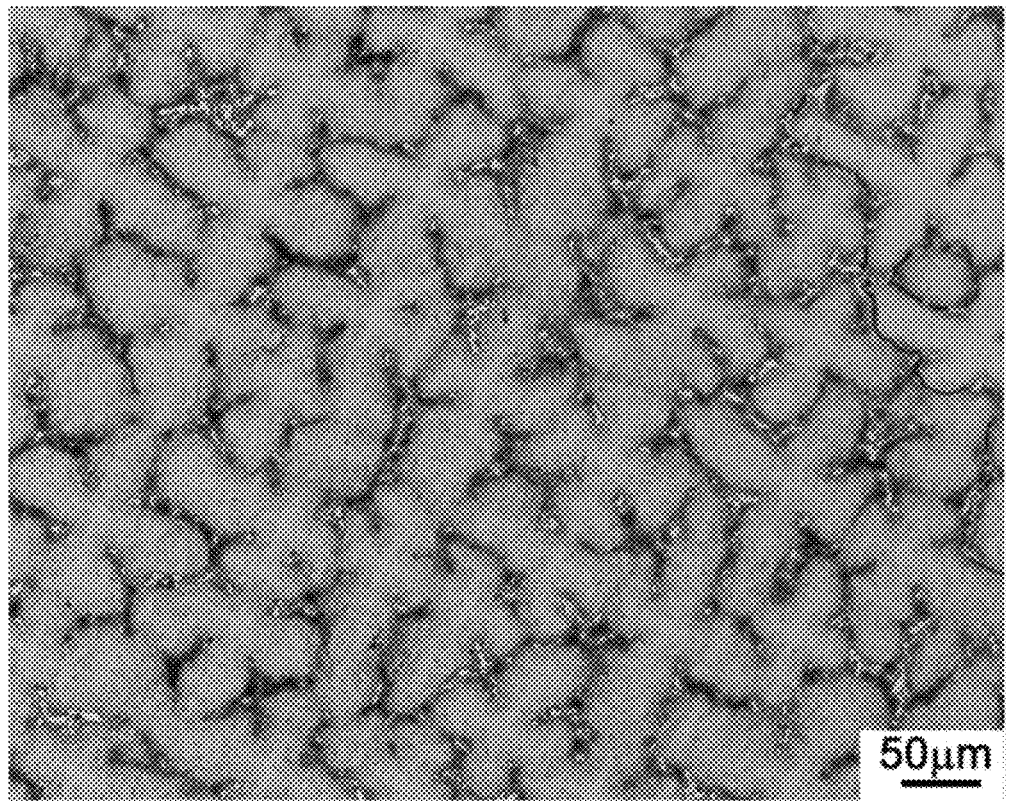
Figure 5:
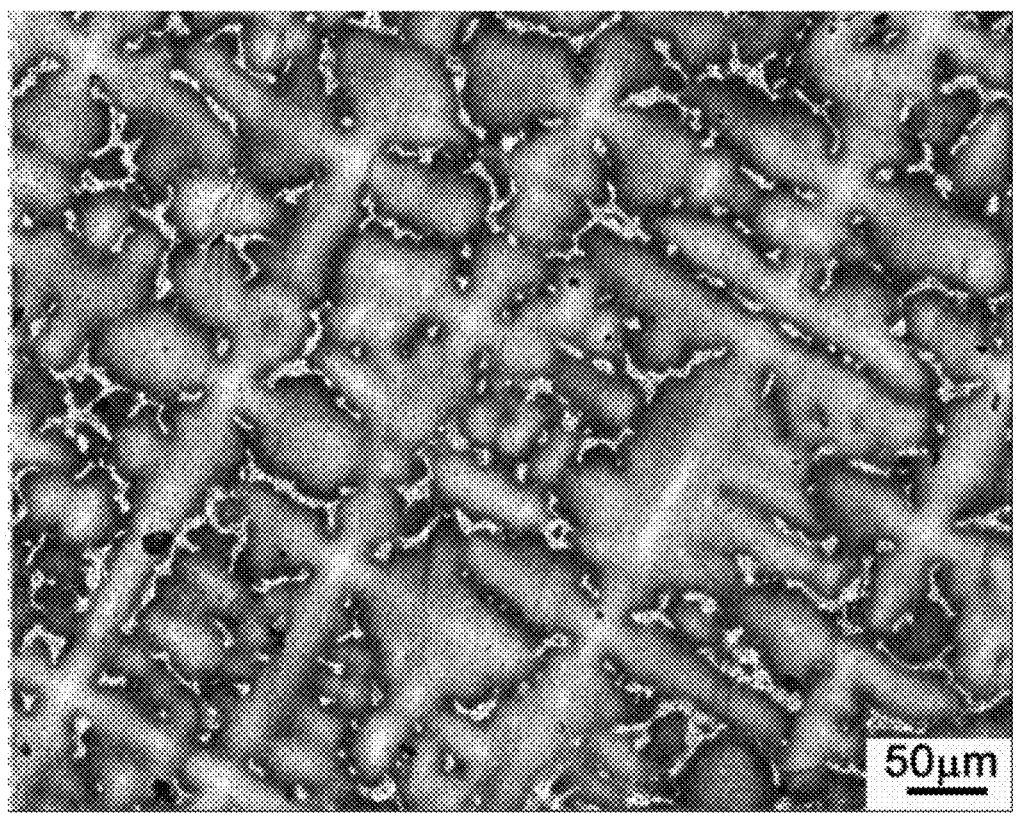
Figure 6:
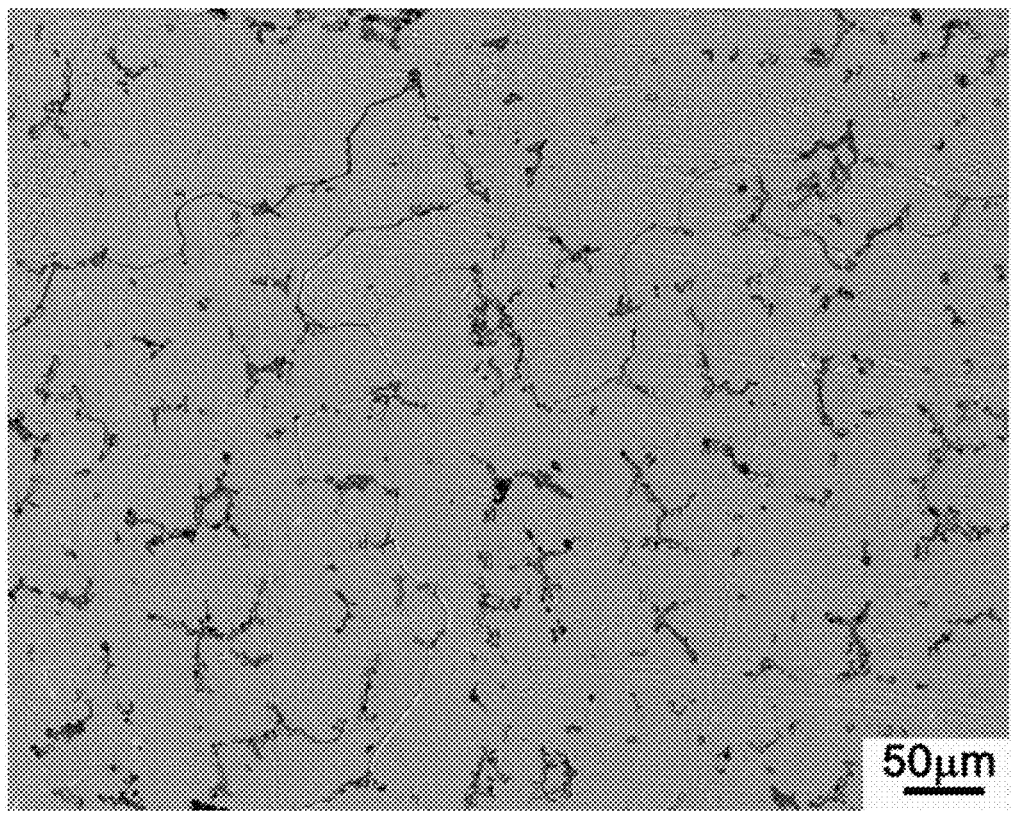
Figure 7:
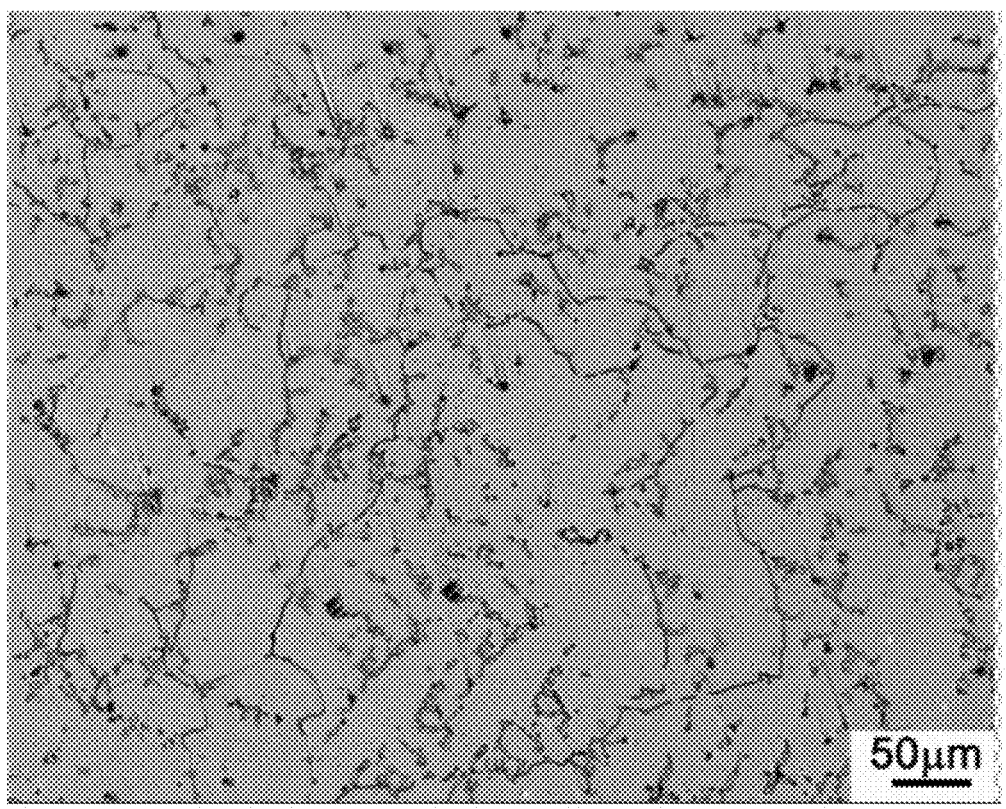
Figure 8:
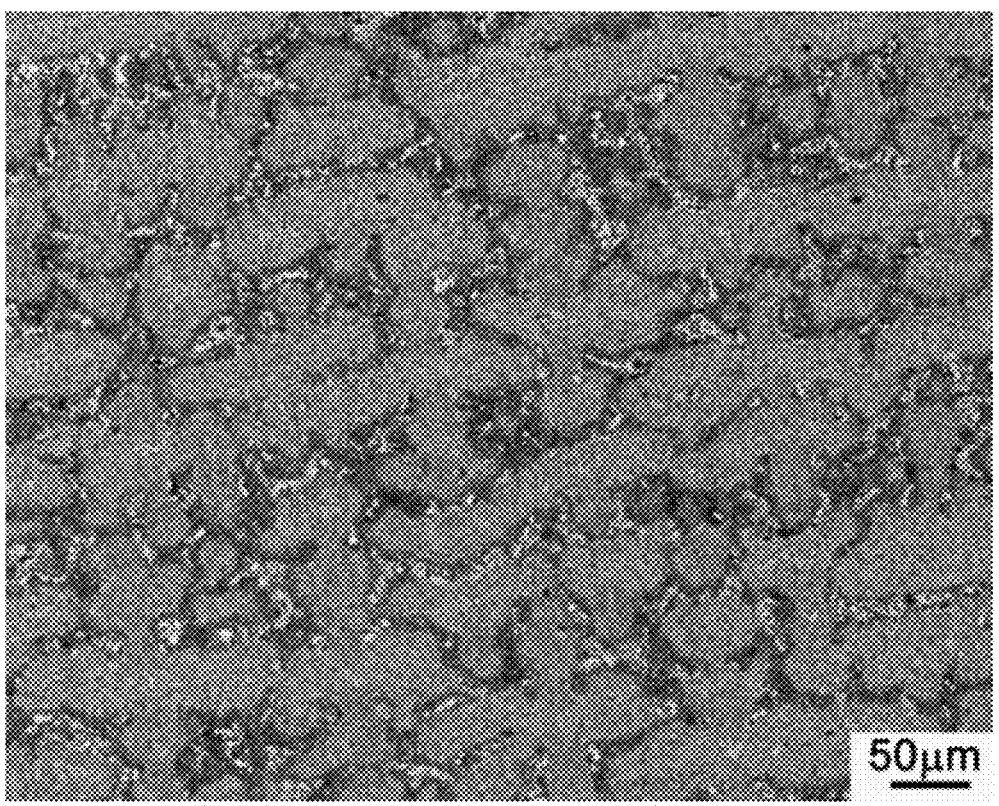
Figure 9:
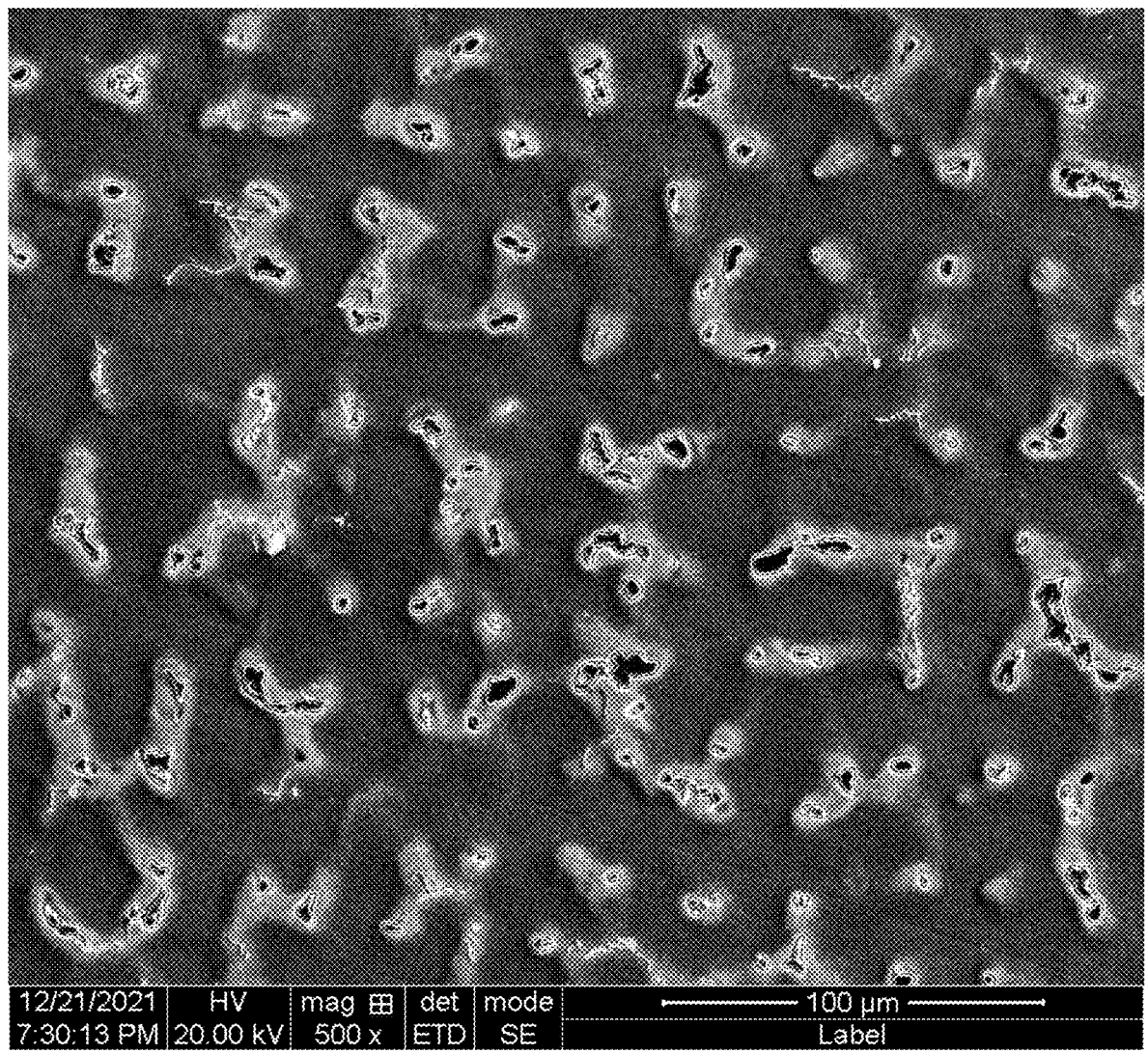
FIGS. 9~14 respectively show structure morphology diagrams of embodiments 1~6 under a scanning electron microscope (SEM).
Figure 10:
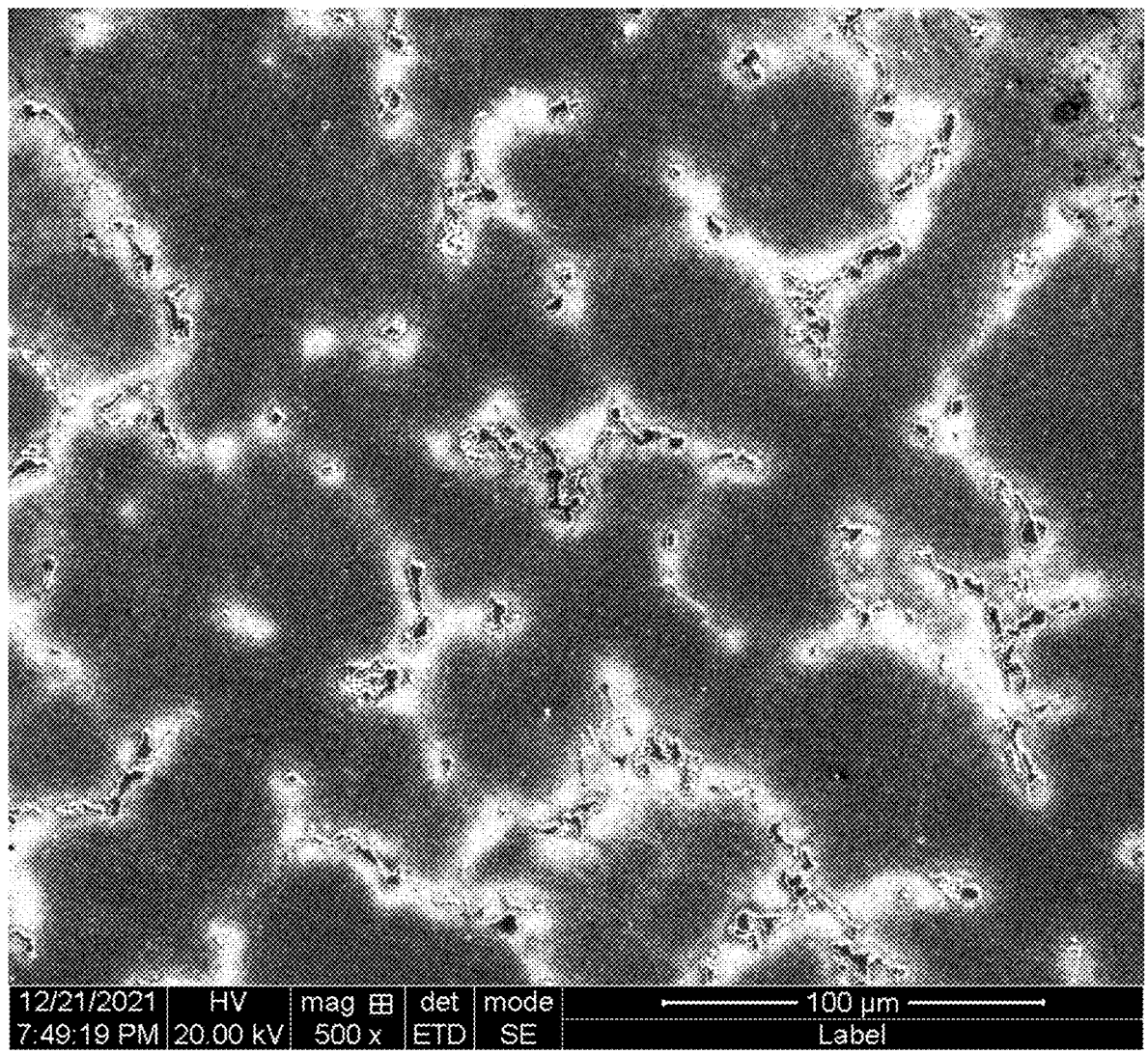
Figure 11:
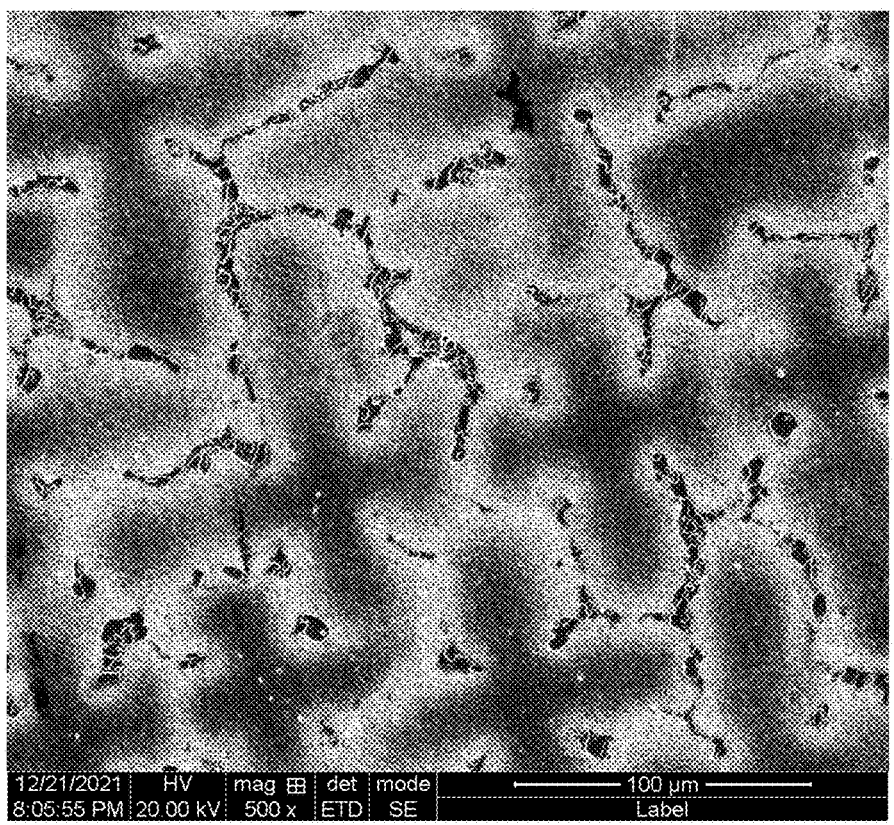
Figure 12:
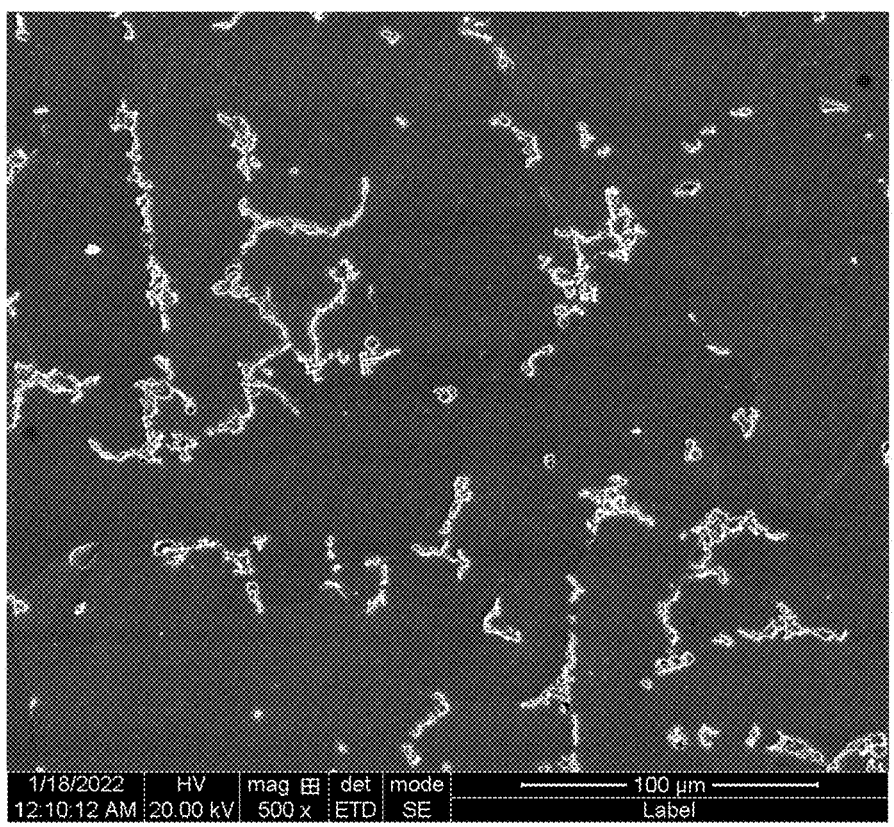
Figure 13:
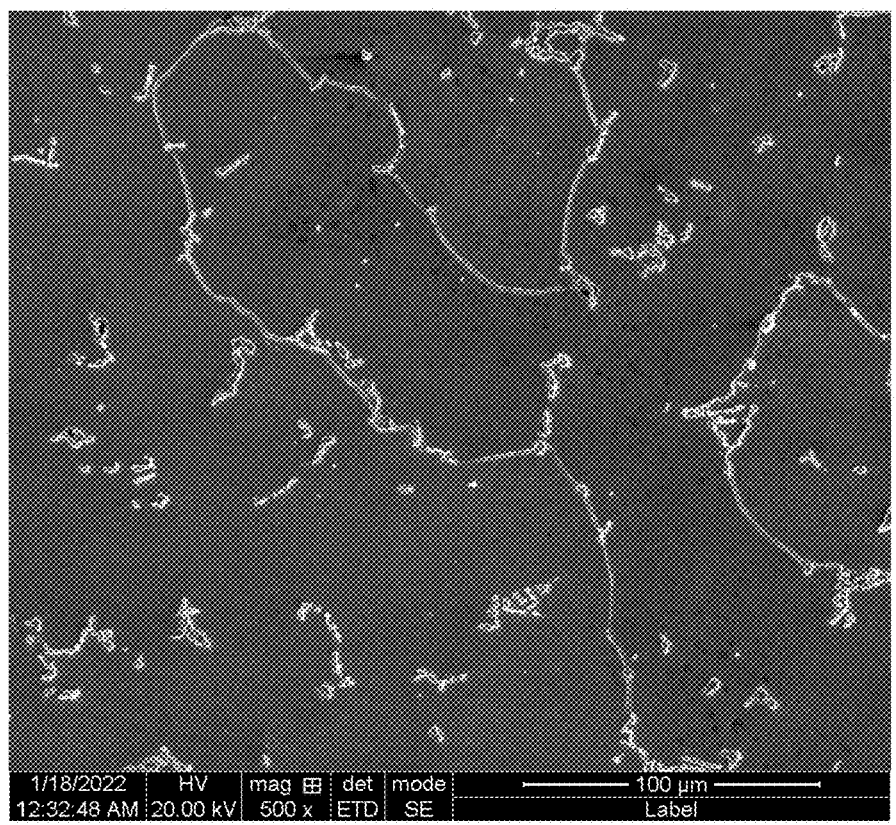
Figure 14:
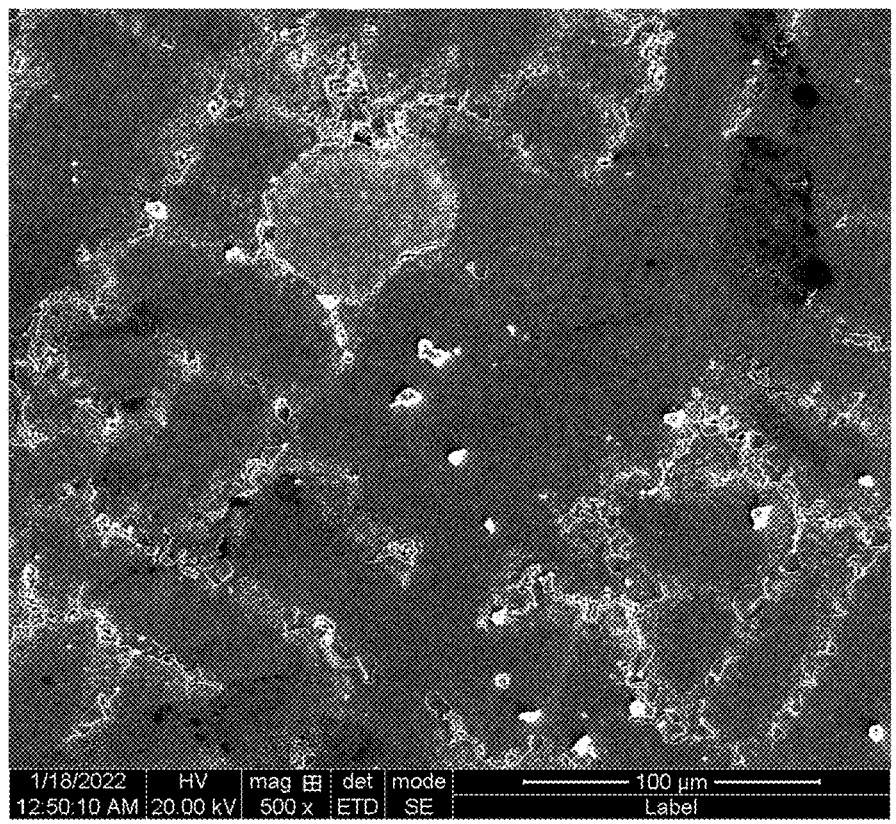

The disclosure provides an Inconel 625 alloy with high aluminum content and a preparation method thereof. The Inconel 625 alloy with high aluminum content consists of following components by mass percentage: 5%~13% of Cr, 5% of Fe, 4.15% of Nb, 10% of Mo, 5~9% of Al, and the balance of Ni.

The preparation method for the Inconel 625 alloy includes following steps:
step (1), weighing reactive materials according to a preset ratio and putting the weighted reactive materials into a planetary ball miller for ball milling;
step (2), pressing, by a press machine, the reactive materials obtained after the ball milling into a cake-shaped slab with a diameter of 80 mm and a height of 50 mm;
step (3), putting the cake-shaped slab into a reactor, arranging an igniter on the cake-shaped slab, adding a protective gas for gas-scrubbing, re-adding the protective gas for maintaining gas pressure, and performing heating to cause a self-propagating reaction (also referred to first smelting) and thereby obtaining a base alloy;
step (4), performing secondary smelting on the base alloy by vacuum induction to obtain an ingot; and
step (5), performing a solution treatment on the ingot at a temperature of 1150° C. for 30 min, to obtain the Inconel 625 alloy.

In the step (1) of the above steps, a duration of the ball milling is 8 hours (h), milling balls for the ball milling are alumina milling balls, a ball to material mass ratio is 2:1, and a rotation speed for the ball milling is 80 revolutions per minute (r/min). And a pressure applied by the press machine is 70 Megapascals (MPa).

In the step (2) of the above steps, the reactive materials includes: nickel oxide (NiO), Cr, Fe, Mo, niobium pentoxide (Nb2O5), and Al powders.

In the step (3) of the above steps, a temperature for the heating is in a range from 280° C. to 340° C., the protective gas is argon gas, and the gas pressure is in a range from 4 MPa to 6 MPa.

In the step (4) of the above steps, a pre-heating duration is 60 min, a vacuum degree is $10^{-2}$ Pa, and a duration for keeping alloying is 10 min.

In the step (5) of the above steps, the performing a solution treatment on the ingot at a temperature of 1150° C. for 30 min includes: performing heating at a rate of 10° C./min to reach the temperature of 1150° C. and maintaining the temperature for 30 min, and performing water quenching.

Based on the standard components of the Inconel 625 alloy, the disclosure controls the Al content and reduces the Cr content of the Inconel 625 alloy by adding excessive Al. In the preparation method of the disclosure, the base alloy is prepared by the thermite method firstly, and then the secondary smelting is performed by vacuum medium frequency induction smelting to eliminate the internal defects caused by the thermite method, and qualified alloy materials are obtained. It can improve the corrosion resistance and creep resistance of the Inconel 625 alloy at high temperature and reduce the cost. The preparation method of the disclosure is environment-friendly and has a simple process and low cost, which is suitable for large-scale production.

The following are specific embodiments of the disclosure, and the technical solutions of the disclosure are further described in combination with the embodiments, but the disclosure should not be limited to the embodiments:

Embodiment 1

Steps for preparing an initial casting slab (also referred to base alloy) by a thermite method are as follows.

TABLE 1

Weight ratio of reactive materials of the Inconel 625 alloy with high aluminum content (wt %) of embodiment 1

| Reactive materials | NiO | Cr | Fe | Nb2O5 | Mo | Al |
|---|---|---|---|---|---|---|
| Content | 55.01 | 13.00 | 3.61 | 4.29 | 7.22 | 16.87 |

(1) Materials are prepared, including: weighing 1 kg reactive materials according to a weight ratio of reactive materials shown in TABLE 1, and dividing the 1 kg reactive materials into four parts after the 1 kg reactive materials being mixed evenly.

(2) Ball milling is performed, including: putting the evenly mixed reactive materials into a planetary ball miller with the model of QM-ISP4 for the ball milling. A rotation speed for the ball milling is 80 r/min, and a duration for the ball milling is 8 h. It is noted that a rotation direction of the ball miller is changed every 2 hours to prevent agglomeration. The materials of the milling balls are aluminum oxide (Al2O3), and a mass ratio of the milling balls to the reactive materials is 2:1.

(3) A base alloy is prepared by a thermite method (also referred to as first melting), including: putting the reactive materials into a mold after the ball milling, then applying pressure of 70 MPa by a hydraulic press machine and holding the pressure for 4 minutes, to press the reactive materials into a round cake-shaped slab with a diameter of about 80 mm and a thickness of about 50 mm. The slab is put in a copper crucible and 2 g of igniter flakes are put above the slab, then the copper crucible is put into a closed reactor for washing off air (also referred to gas-scrubbing). Then argon gas is filled in the reactor as the protective gas and pressure of the argon gas is kept at 5 MPa. After heating by electricity, the igniter flake ignites when a temperature in the reactor rises to more than 280° C., thus causing the thermite reaction. At this time, pressure and the temperature in the reactor rapidly rise. After the thermite reaction starts, a heating switch is turned off. When a product generated after the thermite reaction is cooled to room temperature in the reactor under the protection of argon gas. The reactor is opened and the product is taken out. The product is an alloy which is wrapped with a layer of Al2O3. After the layer of Al2O3 is broken, the base alloy is obtained.

Steps of the secondary smelting performed by vacuum medium frequency induction melting are as follows.

(1) Preparing for a base alloy: the Inconel 625 alloy with high aluminum content prepared by thermite method is processed into a strip with a width of 10 mm by wire cutting, and the dirt on a surface of the strip is polished to prevent the introduction of impurities.

(2) The vacuum medium frequency induction melting: a diffusion pump of the medium frequency induction furnace is preheated for 40~50 min in a smelting process; the base alloy is put into a magnesium aluminum spinel crucible with a volume of 3 kg, then putting a metal trapezoidal mold coated with mold release agent is put and into the medium frequency induction furnace after the metal trapezoidal mold is preheated to 300° C. A vacuum system is turned on to ensure that the vacuum degree is $10^{-2}$ Pa, and then a melting system of the medium frequency induction furnace can be turned on. Heating power of the melting system is adjusted from 0 kilowatt (kw) with an increment of 5 kw, and the heating power is kept for 5 min after each adjustment to ensure uniform heating. When the base alloy observed through an observation port is completely smelted into a metal liquid, the heating power is reduced to 5 kw and time for heat preservation is 10 min to ensure uniform components (also referred to keep alloying). Then the crucible is turned over to pour the metal liquid into the mold, and an ingot of the Inconel 625 alloy with high aluminum content is taken out after cooling.

The ingot of the Inconel 625 alloy with high aluminum content is divided into some samples. The mechanical properties of the Inconel 625 alloy samples are tested at room temperature. A full-automatic micro-hardness test system with a model of WILSON-VH1102 is used for the hardness test. The load is 300 g and the loading time is 12 seconds in the hardness test. The average value of 10 points measured for each sample is expressed by Vickers hardness HV 0.3. A tensile test is performed on an electronic universal testing machine with a model of Shimadzu® AGS-X 300 kN, the tensile rate is 0.5 mm/min by a displacement loading method, and three groups of parallel tests are performed on each of the alloy samples. The results show that the hardness of the Inconel 625 alloy with high aluminum content is 439.1 HV0.3 and its tensile strength is 973.27 MPa, and its elongation is 4.50%.

Embodiment 2

Reactive materials of the embodiment 2 are shown in TABLE 2, the preparation steps of embodiment 2 are the same as the preparation steps of the embodiment 1. Mechanical property test results at room temperature area as follows: a hardness is 445.0 HV0.3, a tensile strength is 1011.64 MPa, and an elongation is 2.68%.

TABLE 2

Weight ratio of reactive materials of the Inconel 625 alloy with high aluminum content (wt %) of embodiment 2

| Reactive materials | NiO | Cr | Fe | Nb$_2$O$_5$ | Mo | Al |
|---|---|---|---|---|---|---|
| Content | 57.06 | 9.27 | 3.57 | 4.24 | 7.13 | 18.74 |

Embodiment 3

Reactive materials of the embodiment 3 are shown in TABLE 3, the preparation steps of embodiment 2 are the same as the preparation steps of the embodiment 1. Mechanical property test results at room temperature area as follows: hardness is 468.5 HV0.3, tensile strength is 984.04 MPa, and elongation is 2.32%.

TABLE 3

Weight ratio of reactive materials of the Inconel 625 alloy with high aluminum content of embodiment 3 (wt %)

| Reactive materials | NiO | Cr | Fe | Nb$_2$O$_5$ | Mo | Al |
|---|---|---|---|---|---|---|
| Content | 59.05 | 5.64 | 3.52 | 4.18 | 7.05 | 20.57 |

Embodiment 4

A solution treatment is performed on the ingot of the Inconel 625 alloy with high aluminum content prepared in the embodiment 1, steps of the solution treatment are as follows: obtaining plates with a thickness of 2.5 mm from the ingot of the Inconel 625 alloy with high aluminum content prepared in the embodiment 1 by wire cutting, then putting the plates into a box-type furnace and heating the plates from room temperature to 1150° C. with a heating rate of 10° C./min; obtaining the temperature of 1150° C. for 30 min, then taking the plates out and performing a water cooling treatment on the plates.

The mechanical properties of the plates at room temperature are tested the same as those in embodiment 1, and tensile properties of the plates are tested at a high temperature of 800° C. The 800° C. high temperature tensile tests are performed on an electronic universal testing machine with a model of AGS-X 300 kN, the tensile rate is 0.2 mm/min by a displacement loading method. Three groups of parallel tests are performed on each of samples. The test data is shown in TABLE 4.

TABLE 4

Mechanical properties of the Inconel 625 alloy with high aluminum content after the solution treatment of embodiment 4

| Temperature | Hardness (HV0.3) | Tensile strength (MPa) | Elongation (%) |
|---|---|---|---|
| Room temperature | 277.6 | 560.23 | 43.34 |
| 800° C. | / | 310.40 | 3.40 |

Embodiment 5

A solution treatment is performed on the Inconel 625 alloy with high aluminum content prepared in the embodiment 2, steps of the solution treatment of embodiment 5 is the same as the embodiment 4, data of mechanical properties of the Inconel 625 alloy with high aluminum content after the solution treatment is shown in TABLE 5.

TABLE 5

Mechanical properties of the Inconel 625 alloy with high aluminum content after the solution treatment of embodiment 5

| Temperature | Hardness (HV0.3) | Tensile strength (MPa) | Elongation (%) |
|---|---|---|---|
| Room temperature | 419.8 | 896.30 | 10.40 |
| 800° C. | / | 511.08 | 2.53 |

Embodiment 6

A solution treatment is performed on the Inconel 625 alloy with high aluminum content prepared in the embodiment 3, steps of the solution treatment of embodiment 6 is the same as the embodiment 4, data of mechanical properties of the Inconel 625 alloy with high aluminum content after the solution treatment is shown in TABLE 6.

TABLE 6

Mechanical properties of the Inconel 625 alloy with high aluminum content after the solution treatment of embodiment 6

| Temperature | Hardness (HV0.3) | Tensile strength (MPa) | Elongation (%) |
|---|---|---|---|
| Room temperature | 453.5 | 766.33 | 4.70 |
| 800° C. | / | 521.82 | 2.93 |

Data shows that the disclosure realizes the preparation for the Inconel 625 alloy with high aluminum content.

The above embodiments are only some specific embodiments of the disclosure, but the protection scope of the disclosure is not limited to this. Any change or replacement that can easily be thought of by those skilled in the art within the technical scope of the disclosure should be included in the protection scope of the disclosure. The protection scope of the disclosure is subject to the protection scope of the claims.

What is claimed is:

1. An Inconel 625 alloy, consisting of following components by mass percentage:
   5%~13% of chromium (Cr),
   5% of ferrum (Fe),
   4.15% of niobium (Nb),
   10% of molybdenum (Mo),
   5~9% of aluminum (Al), and
   the balance of nickel (Ni).

* * * * *